(12) United States Patent
Du et al.

(10) Patent No.: US 10,149,055 B2
(45) Date of Patent: Dec. 4, 2018

(54) LOUD-SPEAKING, LOUD-SPEAKER AND INTERACTIVE DEVICE

(71) Applicant: Beijing Zhigu Rui Tuo Tech Co., Ltd, Beijing (CN)

(72) Inventors: Lin Du, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/109,121

(22) PCT Filed: Nov. 6, 2014

(86) PCT No.: PCT/CN2014/090440
§ 371 (c)(1),
(2) Date: Jun. 29, 2016

(87) PCT Pub. No.: WO2015/101106
PCT Pub. Date: Jul. 9, 2015

(65) Prior Publication Data
US 2016/0330547 A1   Nov. 10, 2016

(30) Foreign Application Priority Data

Dec. 31, 2013   (CN) .......................... 2013 1 0752876

(51) Int. Cl.
*H04R 3/12* (2006.01)
*H04R 29/00* (2006.01)
(Continued)

(52) U.S. Cl.
CPC ............... *H04R 3/12* (2013.01); *G06F 3/165* (2013.01); *H04R 3/04* (2013.01); *H04R 29/002* (2013.01); *H04R 2430/00* (2013.01)

(58) Field of Classification Search
CPC .. G06F 3/165; H04R 3/04; H04R 3/12; H04R 29/001; H04R 29/002; H04R 2430/00
(Continued)

(56) References Cited

U.S. PATENT DOCUMENTS 4,359,606 A * 11/1982 Shoichi ................. H04M 3/569
                                                              379/202.01
4,369,412 A *  1/1983 Sakano ...................... H03F 1/52
                                                                  330/112
(Continued)

FOREIGN PATENT DOCUMENTS

CN          1554208 A      12/2004
CN        101170843 A       4/2008
(Continued)

OTHER PUBLICATIONS

Naef et al., "Spatialized audio rendering for immersive virtual environments", Proceeding VRST '02 Proceedings of the ACM symposium on Virtual reality software and technology, pp. 65-72, ACM New York, NY, USA, Nov. 2002. Retrieved on Jun. 8, 2016, 8 pages.
(Continued)

*Primary Examiner* — Yogeshkumar Patel
(74) *Attorney, Agent, or Firm* — Amin, Turocy & Watson, LLP

(57) ABSTRACT

A loud-speaking apparatus can comprise a loudspeaker array comprising multiple loud-speaking units, wherein each loud-speaking unit is configured to produce sound according to an input signal; a fault detection module, configured to detect fault parameters of a loud-speaking unit in the loudspeaker array; and a compensation module, configured to adjust, according to the fault parameters, the input signal corresponding to a related loud-speaking unit in the loudspeaker array, to compensate for a sound effect of the loudspeaker array affected by the loud-speaking unit having
(Continued)

a sound production fault. A loudspeaker array comprising multiple loud-speaking units can be arranged, and when a loud-speaking unit having a sound production fault is detected, an input signal corresponding to the loud-speaking unit can be adjusted, so as to reduce an impact of the loud-speaking unit having a sound production fault on the sound effect during use, and improve user experience.

24 Claims, 5 Drawing Sheets

(51) Int. Cl.
   *H04R 3/04* (2006.01)
   *G06F 3/16* (2006.01)
(58) Field of Classification Search
   USPC .................................................. 381/58, 96
   See application file for complete search history.

(56) References Cited

U.S. PATENT DOCUMENTS

| | | | | |
|---|---|---|---|---|
| 4,379,209 A * | 4/1983 | Sakano | ............. | H03F 1/52 330/207 P |
| 4,990,286 A | 2/1991 | Gordon | | |
| 5,361,305 A * | 11/1994 | Easley | ............. | H04B 1/082 381/58 |
| 6,005,957 A * | 12/1999 | Meeks | ............. | F01N 1/065 181/171 |
| 6,760,451 B1 * | 7/2004 | Craven | ............. | H03G 5/005 381/59 |
| 6,798,889 B1 * | 9/2004 | Dicker | ............. | H04S 7/301 381/103 |
| 7,158,643 B2 * | 1/2007 | Lavoie | ............. | H04S 7/301 381/303 |
| 7,630,501 B2 * | 12/2009 | Blank | ............. | H04S 7/301 381/300 |
| 8,880,058 B2 * | 11/2014 | Helm | ............. | H04B 17/104 455/425 |
| 9,661,432 B2 * | 5/2017 | Silzle | ............. | H04R 5/027 |
| 2002/0071569 A1 * | 6/2002 | Wood | ............. | H04R 29/001 381/59 |
| 2003/0008689 A1 | 1/2003 | Uda | | |
| 2003/0048911 A1 * | 3/2003 | Furst | ............. | H04R 3/02 381/96 |
| 2003/0059069 A1 | 3/2003 | Bank et al. | | |
| 2003/0142833 A1 * | 7/2003 | Roy | ............. | H04R 27/00 381/73.1 |
| 2003/0220705 A1 * | 11/2003 | Ibey | ............. | H04R 5/04 700/94 |
| 2004/0202333 A1 * | 10/2004 | Csermak | ............. | H04R 25/305 381/60 |
| 2005/0008165 A1 * | 1/2005 | Sack | ............. | H04R 1/026 381/59 |
| 2005/0152557 A1 * | 7/2005 | Sasaki | ............. | H04S 7/302 381/58 |
| 2006/0083391 A1 * | 4/2006 | Nishida | ............. | H04S 7/301 381/96 |
| 2006/0251265 A1 * | 11/2006 | Asada | ............. | H04R 29/001 381/58 |
| 2007/0202917 A1 | 8/2007 | Phelps et al. | | |
| 2008/0063211 A1 * | 3/2008 | Kusunoki | ............. | H04R 3/12 381/18 |
| 2008/0085019 A1 | 4/2008 | Wagenaars et al. | | |
| 2008/0273714 A1 * | 11/2008 | Hartung | ............. | H04R 5/02 381/86 |
| 2009/0066499 A1 * | 3/2009 | Bai | ............. | G10K 15/02 340/459 |
| 2010/0008512 A1 * | 1/2010 | Packer | ............. | H04R 27/00 381/57 |
| 2010/0074451 A1 * | 3/2010 | Usher | ............. | H04R 25/70 381/58 |
| 2010/0272273 A1 * | 10/2010 | Chua | ............. | H04R 1/10 381/60 |
| 2010/0296658 A1 * | 11/2010 | Ohashi | ............. | H04S 7/305 381/57 |
| 2012/0263309 A1 * | 10/2012 | Hiraki | ............. | H04R 29/001 381/59 |
| 2012/0294450 A1 * | 11/2012 | Ozcan | ............. | H04R 3/007 381/59 |
| 2013/0028430 A1 * | 1/2013 | Bares | ............. | H04R 5/04 381/59 |
| 2013/0070932 A1 * | 3/2013 | Nyu | ............. | H04R 3/007 381/58 |
| 2013/0073748 A1 * | 3/2013 | Masuda | ............. | H04R 27/00 710/15 |
| 2013/0089210 A1 * | 4/2013 | Martin | ............. | H04M 9/08 381/58 |
| 2013/0179163 A1 * | 7/2013 | Herbig | ............. | H04R 3/005 704/233 |
| 2013/0315419 A1 | 11/2013 | Chien | | |
| 2014/0307881 A1 * | 10/2014 | Fuertes, III | ............. | H04R 29/001 381/59 |
| 2015/0139427 A1 * | 5/2015 | Sakai | ............. | H04S 5/02 381/17 |

FOREIGN PATENT DOCUMENTS

| | | |
|---|---|---|
| CN | 101326075 A | 12/2008 |
| CN | 102006541 A | 4/2011 |
| CN | 102375536 A | 3/2012 |
| CN | 202276442 U | 6/2013 |
| CN | 103702259 A | 4/2014 |
| CN | 103747409 A | 4/2014 |
| CN | 103425335 A | 6/2016 |
| EP | 2429155 A1 | 3/2012 |
| JP | 2007053610 A | 3/2007 |
| KR | 20110127930 A | 11/2011 |
| WO | 2012064285 A1 | 5/2012 |
| WO | 2012090032 A1 | 7/2012 |

OTHER PUBLICATIONS

International Search Report for International Application No. PCT/CN2014/090440, dated Feb. 10, 2015, 2 pages.
Office Action dated May 5, 2017 for U.S. Appl. No. 15/109,120, 36 pages.
International Search Report for International Application No. PCT/CN2014/090439, dated Feb. 3, 2015, 2 pages.
Office Action dated Nov. 21, 2017 for U.S. Appl. No. 15/109,120, 30 pages.
Notice of Allowance Dated Jun. 4, 2018 for U.S. Appl. No. 15/109,120, 26 pages.

* cited by examiner

US 10,149,055 B2

LOUD-SPEAKING, LOUD-SPEAKER AND INTERACTIVE DEVICE

RELATED APPLICATION

The present application is a U.S. National Stage filing under 35 U.S.C. § 371 of international patent cooperation treaty (PCT) application No. PCT/CN2014/090440, filed Nov. 6, 2014, and entitled "LOUD-SPEAKING, LOUD-SPEAKER AND INTERACTIVE DEVICE", which claims the benefit of priority to Chinese Patent Application No. 201310752876.7, filed on Dec. 31, 2013, which applications are hereby incorporated into the present application by reference herein in their respective entireties.

TECHNICAL FIELD

The present application relates to the field of loud-speaking technologies, and in particular, to loud-speaking, loud-speaker(s), and interactive device(s).

BACKGROUND

When a loudspeaker is in use, if a sound production fault occurs in the loudspeaker, for example, when an internal device ages or is damaged, or the environment is too humid or the temperature is too high, or the surface is covered, the loudspeaker cannot produce sound normally, and a sound effect of the loudspeaker is affected, which brings about a bad experience to users. Generally speaking, only when finding that the sound effect of the loudspeaker has a problem do the users check the loudspeaker, so as to troubleshoot the problem or replace the loudspeaker.

SUMMARY

An example, non-limiting objective of the present application is to provide a loud-speaking technology, so as to reduce an impact of a sound production fault of a loud-speaker in use on a sound effect of the loudspeaker as much as possible, and improve user experience.

In a first aspect, an example embodiment of the present application provides a loud-speaking apparatus, comprising:

a loudspeaker array comprising multiple loud-speaking units, wherein each loud-speaking unit is configured to produce sound according to an input signal;

a fault detection module, configured to detect fault at least one parameter of at least one loud-speaking unit in the loudspeaker array; and a compensation module, configured to, in response to at least one loud-speaking unit of the at least one loud-speaking unit having a sound production fault, adjust, according to the fault parameters, the input signal corresponding to at least one related loud-speaking unit in the loudspeaker array, to compensate for a sound effect of the loudspeaker array affected by the at least one loud-speaking unit having a sound production fault.

In a second aspect, an example embodiment of the present application provides an interactive device, comprising the loud-speaking apparatus.

In a third aspect, an example embodiment of the present application provides a loud-speaking method, comprising:

detecting at least one fault parameter of at least one loud-speaking unit in a loudspeaker array, wherein the loudspeaker array comprises multiple loud-speaking units, and each loud-speaking unit is configured to produce sound according to an input signal; and in response to at least one loud-speaking unit of the at least one loud-speaking unit having a sound production fault, adjusting, according to the at least one fault parameter, the input signal corresponding to at least one related loud-speaking unit in the loudspeaker array, to compensate for a sound effect of the loudspeaker array affected by the at least one loud-speaking unit that has a sound production fault and corresponds to the fault parameters.

According to at least one of the embodiments of the present application, a loudspeaker array comprising multiple loud-speaking units is set, a loud-speaking unit having a sound production fault in the loudspeaker array is detected, and when the loud-speaking unit having a sound production fault exists, an input signal corresponding to the loud-speaking unit is adjusted, so as to reduce an impact of the loud-speaking unit having a sound production fault on a sound effect of the loudspeaker array during use of the loudspeaker array, and improve user experience.

DETAILED DESCRIPTION

Figure 1:
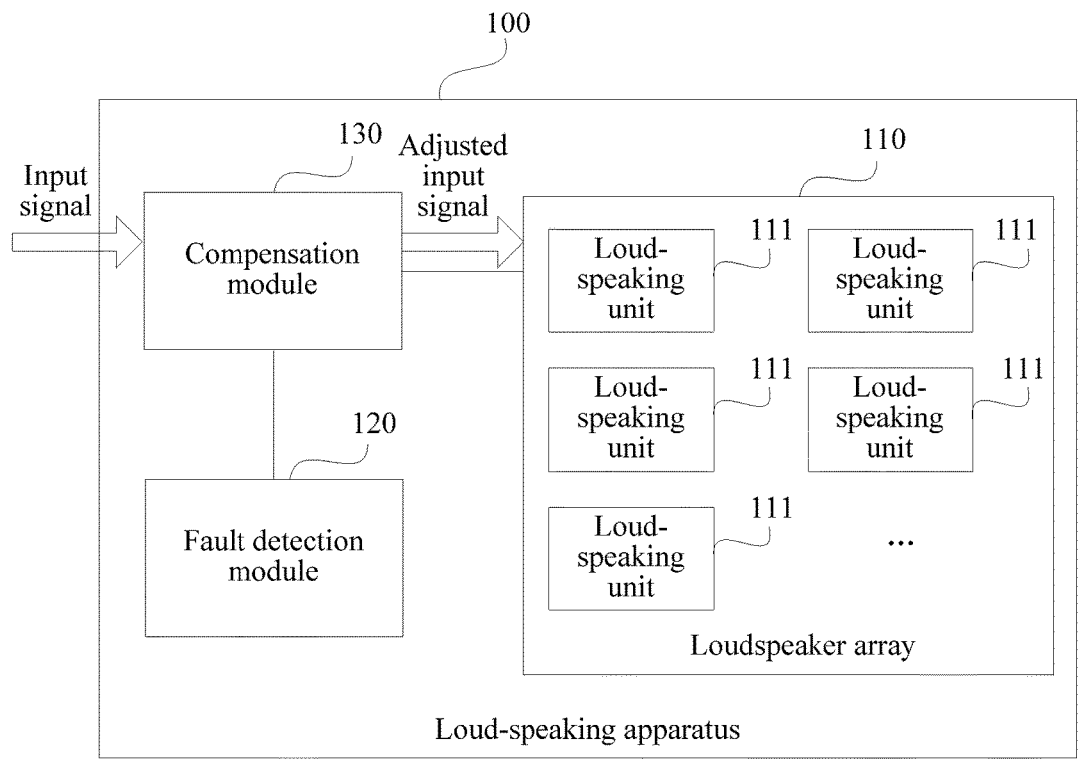
FIG. 1 is a schematic structural block diagram of a loud-speaking apparatus according to an embodiment of the present application.

Specific example embodiments of the present application are described in detail below with reference to the accompanying drawings (like reference numerals refer to like elements) and embodiments. The following embodiments are intended to describe the present application, but not to limit the scope of the present application.

During use of a loudspeaker, a sound effect of the loudspeaker may be affected when a sound production fault occurs in the loudspeaker, which affects listening experience of users. Therefore, as shown in FIG. 1, an embodiment of the present application provides a loud-speaking apparatus 100, comprising:

a loudspeaker array 110 comprising multiple loud-speaking units 111, wherein each loud-speaking unit is configured to produce sound according to an input signal;

a fault detection module 120, configured to detect fault parameters of at least one loud-speaking unit in the loudspeaker array; and a compensation module 130, configured to, when at least one loud-speaking unit having a sound production fault exists, adjust, according to the fault parameters, the input signal corresponding to at least one related loud-speaking unit in the loudspeaker array, to compensate for a sound effect of the loudspeaker array affected by the at least one loud-speaking unit having a sound production fault.

In an example embodiment, the input signals corresponding to at least two loud-speaking units in the multiple loud-speaking units are different. For example, the multiple loud-speaking units 111 in the loudspeaker array 110 may separately correspond to multiple different input signals, that is, the multiple different input signals may be controlled separately. Alternatively, the multiple loud-speaking units 111 may be divided into multiple loud-speaking unit groups, each loud-speaking unit group comprises at least two loud-speaking units 111, and the loud-speaking units 111 in each loud-speaking unit group correspond to the same input signal (for example, a group of loud-speaking units 111 share the same conductor for signal input). With such a structure, when a sound production fault occurs in one or more loud-speaking units 111, other loud-speaking units 111 can compensate for the overall sound effect of the loudspeaker array by adjusting the corresponding input signal. Herein, the input signal may be, for example, a vibration sequence signal including amplitude, frequency, and phase information, which is used to determine the vibration amplitude, frequency, and phase of the corresponding loud-speaking units. Certainly, in an example embodiment, the input signals of the multiple loud-speaking units are the same, and when at least one obstacle is detected, raising the amplitude of the input signals can also compensate for the sound effect of the loudspeaker array.

In this example embodiment, the fault detection module 120 may detect the fault parameters of each loud-speaking unit 111 in the loudspeaker array 110 in real time, so that the compensation module 130 can make proper compensation in real time once a sound production fault occurs in the loud-speaking unit during use of the loud-speaking apparatus 100. Certainly, in other embodiments of the present application, the fault detection module 120 may also be configured to only detect fault parameters of some loud-speaking units 111 in the multiple loud-speaking units 111. For example, in a certain loudspeaker array, only the sound effect of some loud-speaking units 111 can be compensated when these loud-speaking units have a sound production fault, while even if other loud-speaking units 111 have a fault, compensation cannot be made by using other loud-speaking units 111; therefore, fault detection may not be performed on the loud-speaking units 111 to which compensation cannot be made, and only fault parameters of the loud-speaking units to which compensation can be made are detected.

In one example embodiment, the compensation module 130 may directly generate a new input signal correspondingly according to the fault parameters and a current input signal. In other example embodiments, the compensation module 130 superimposes, according to the fault parameters, a compensation signal component on the input signal corresponding to each loud-speaking unit, and this example embodiment will be further described below, so the details are not repeated herein. Herein, the compensating for a sound effect of the loudspeaker array affected by the at least one loud-speaking unit having a sound production fault specifically is: reducing a difference between a waveform, on at least one target position (for example, the position of a listener's ears), of a sound wave produced by the loudspeaker array when the at least one loud-speaking unit having a sound production fault exists and a waveform when the loud-speaking units all can normally produce sound.

In one example embodiment, the compensation module 130 may compare the fault parameters acquired by the fault detection module 120 with preset reference parameters and perform analysis, to obtain information indicating whether a loud-speaking unit having a sound production fault exists, and a position, a fault type and the like of the loud-speaking unit having a sound production fault. For example, when a difference between the fault parameters and the reference parameters is within a set range, it indicates that the loud-speaking unit having a sound production fault does not exist; when the difference is beyond the set range, it indicates that the loud-speaking unit having a sound production fault exists, and the position, the fault type, and other information of the loud-speaking unit having a sound production fault are obtained by analyzing the difference.

To sum up, in this embodiment, a loudspeaker array comprising multiple loud-speaking units is arranged, a loud-speaking unit having a sound production fault in the affected loudspeaker array is detected, and an input signal corresponding to the loud-speaking unit is adjusted when the loud-speaking unit having a sound production fault exists, so as to reduce an impact of the loud-speaking unit having a sound production fault on a sound effect of the loudspeaker array during use of the loudspeaker array, and improve user experience.

Figure 2:
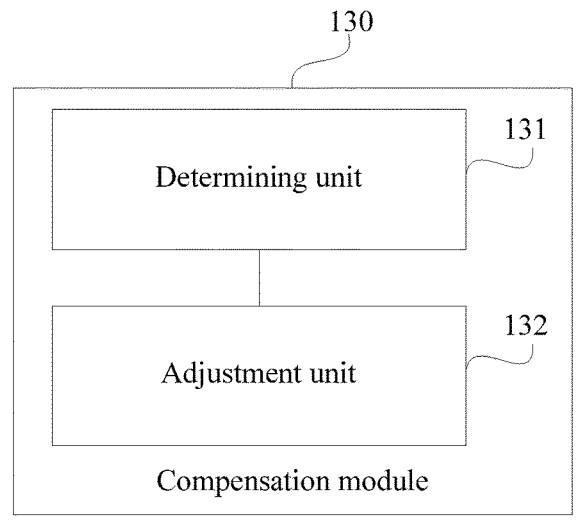
FIG. 2 is a schematic structural block diagram of a compensation module of a loud-speaking apparatus according to an embodiment of the present application.

As shown in FIG. 2, in one example embodiment of the present application, the compensation module 130 comprises:

a determining unit 131, configured to determine, according to the fault parameters, the at least one related loud-speaking unit and input signal adjustment parameters corresponding to the at least one related loud-speaking unit; and an adjustment unit 132, configured to adjust, according to the input signal adjustment parameters, the input signal corresponding to the at least one related loud-speaking unit.

The related loud-speaking unit herein is a loud-speaking unit to be adjusted and determined according to the fault parameters.

The input signal adjustment parameters comprise at least one type of the following: amplitude adjustment parameters, phase adjustment parameters, and frequency adjustment parameters. For example, if the input signal adjustment parameters comprise the amplitude adjustment parameters, the adjustment unit adjusts the amplitude of the input signal according to the amplitude adjustment parameters, and then the vibration amplitude of a loud-speaking unit which produces sound according to the input signal may change correspondingly.

In this example embodiment, the determining unit 131 determines, according to the fault parameters acquired by the fault detection module 120, which loud-speaking units in the loudspeaker array need to be adjusted, wherein the fault parameters are, for example, the positions of loud-speaking units having a sound production fault, and obtains, through calculation, input signal adjustment parameters corresponding to the loud-speaking units to be adjusted. For example, the input signal adjustment parameters are obtained by a sound synthesis method such as sound ray tracing or a head related transfer function (HRTF). Herein, the at least one related loud-speaking unit to be adjusted may comprise the loud-speaking unit having a sound production fault, and in this case, the input signal adjustment parameters corresponding to the loud-speaking unit having a sound production fault may be, for example, amplitude adjustment parameters used to lower or raise the amplitude corresponding to a current input signal of a hampered loud-speaking unit (for example, due to hardware aging, the vibration amplitude of a loud-speaking unit is reduced, and in this case, a sound effect of the loud-speaking unit can be compensated by raising the amplitude of the corresponding input signal; for another example, due to a hardware fault, a loud-speaking unit produces harsh sound disharmonious with sound produced by other loud-speaking units, and in this case, the amplitude of an input signal corresponding to the loud-speaking unit can be lowered, for example, adjusted to zero, so that the loud-speaking unit is reduced in the sound volume or produces no sound); in addition, the at least one related loud-speaking unit to be adjusted further comprises loud-speaking units having no sound production fault, that is, loud-speaking units that can normally produce sound, wherein, in order to compensate for the sound effect of the loud-speaking unit having a sound production fault, it is generally necessary to superimpose a compensation component relevant to the loud-speaking unit having a sound production fault on input signals corresponding to the loud-speaking units having no sound production fault, so that these loud-speaking units additionally produce a sound effect corresponding to the compensation component. Certainly, in order to ensure the overall sound effect of the loudspeaker array, the compensation component corresponding to some loud-speaking units may also be negative.

Figure 2A:
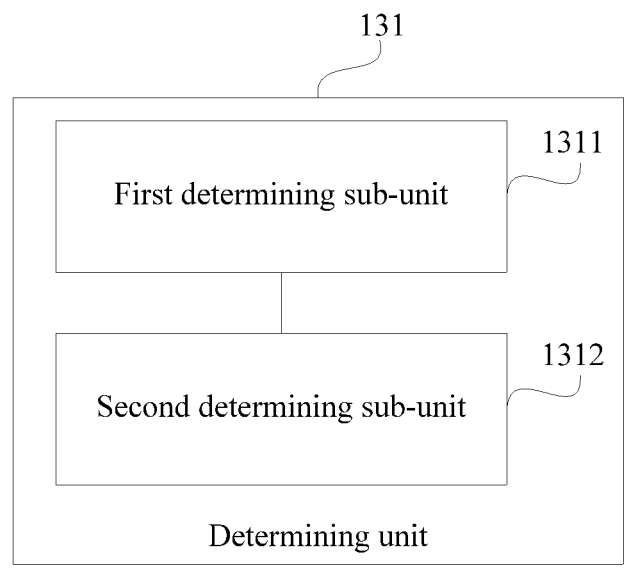
FIG. 2a and FIG. 2b are two schematic structural block diagrams of a determining unit of a loud-speaking apparatus according to an embodiment of the present application.

As shown in FIG. 2a, in one example embodiment of the present application, the determining unit 131 comprises:

a first determining sub-unit 1311, configured to determine the at least one loud-speaking unit having a sound production fault according to the fault parameters; and a second determining sub-unit 1312, configured to determine, according to the at least one loud-speaking unit having a sound production fault, the at least one related loud-speaking unit and the input signal adjustment parameters corresponding to the at least one related loud-speaking unit.

In an example embodiment of the present application, it is likely that the fault parameters directly comprise information about the corresponding loud-speaking unit, and the first determining sub-unit 1311 may directly determine the at least one loud-speaking unit having a sound production fault according to the fault parameters. Certainly, in other embodiments of the embodiments of the present application, the loud-speaking unit having a sound production fault may be determined indirectly according to other information comprised in the fault parameters. For example, the first determining sub-unit 1311 determines, according to the fault parameters obtained by the fault detection module 120, position information about a position where a fault occurs, and determines a corresponding loud-speaking unit having a sound production fault according to the position information.

Figure 2B:
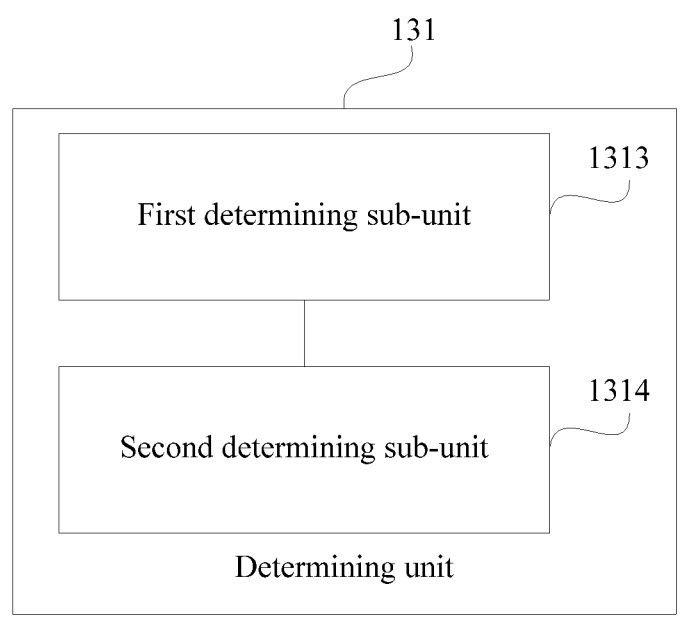

As shown in FIG. 2b, in another example embodiment of the present application, the determining unit 131 comprises:

a first determining sub-unit 1313, configured to determine, according to the fault parameters, the at least one loud-speaking unit having a sound production fault and fault information of the at least one loud-speaking unit having a sound production fault; and a second determining sub-unit 1314, configured to determine, according to the at least one loud-speaking unit having a sound production fault and the fault information, the at least one related loud-speaking unit and input signal adjustment parameters corresponding to the at least one related loud-speaking unit.

The manner in which the first determining sub-unit 1313 determines the at least one loud-speaking unit having a sound production fault according to the fault parameters may be the same as the manner described in the corresponding example embodiment in FIG. 2a.

In this implementation manner, the fault information of the loud-speaking unit may comprise fault type information of the loud-speaking unit, and in addition, may also comprise fault degree information of the loud-speaking unit. Herein, the fault type information of the loud-speaking unit may comprise that, for example, the loud-speaking unit does not produce any sound (for example, due to sound production breakage or device damage), the sound volume of the loud-speaking unit deviates (for example, due to too low or too high vibration amplitude of the loud-speaking unit), and the sound production frequency of the loud-speaking unit deviates. The fault degree information may comprise, for example, a degree or a value of deviation between the sound volume or frequency of the loud-speaking unit and the sound volume or frequency when the corresponding loud-speaking unit operates normally. In this case, the fault parameters may comprise: acoustic characteristic parameters of the loud-speaking units, such as one or more of sound conversion efficiency and frequency-domain response characteristics of the loud-speaking units; or may be vibration feedback signals of the loud-speaking units.

The compensation module 130 can adjust the input signal of the corresponding loud-speaking unit more properly according to the fault type information and the fault degree information.

Figure 3:
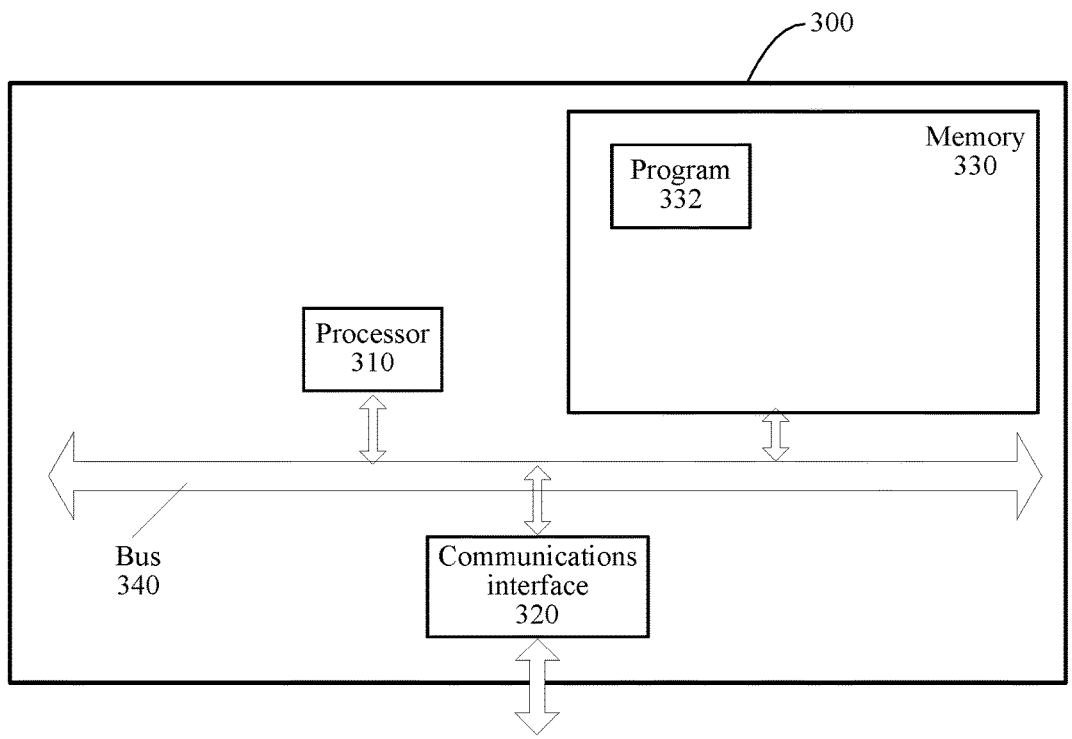
FIG. 3 is a schematic structural block diagram of a loud-speaking apparatus according to an embodiment of the present application.

FIG. 3 is a schematic structural diagram of another loud-speaking apparatus 300 provided in an embodiment of the present application, and the specific embodiment of the present application does not limit specific implementation of the loud-speaking apparatus 300. As shown in FIG. 3, the loud-speaking apparatus 300 may comprise:

a processor 310, a communications interface 320, a memory 330, and a communications bus 340.

The processor 310, the communications interface 320, and the memory 330 complete mutual communication via the communications bus 340.

The communications interface 320 is configured to communicate with a network element such as a client.

The processor 310 is configured to execute a program 332, and specifically, can execute relevant steps in the following method embodiment.

Specifically, the program 332 may comprise program code, and the program code comprises a computer operation instruction.

The processor 310 may be a central processing unit (CPU), or an application specific integrated circuit (ASIC), or be configured to be one or more integrated circuits which implement the embodiments of the present application.

The memory 330 is configured to store the program 332. The memory 330 may comprise a high-speed random access memory (RAM), and may also comprise a non-volatile memory, for example, at least one magnetic disk memory. The program 332 may specifically be configured to make the loud-speaking apparatus 300 execute the following steps:

a fault detection step: detecting fault parameters of at least one loud-speaking unit in a loudspeaker array, wherein the loudspeaker array comprises multiple loud-speaking units, and each loud-speaking unit is configured to produce sound according to an input signal; and a compensation step: when at least one loud-speaking unit having a sound production fault exists, adjusting, according to the fault parameters, the input signal corresponding to at least one related loud-speaking unit in the loudspeaker array, to compensate for a sound effect of the loudspeaker array affected by the at least one loud-speaking unit that has a sound production fault and corresponds to the fault parameters.

Reference may be made to the corresponding description of corresponding modules and units in the embodiments shown in FIG. 1, FIG. 2, FIG. 2*a* and FIG. 2*b* for specific implementation of the steps in the program 332, so the details are not repeated herein. Those skilled in the art can clearly understand that, for the purpose of convenient and brief description, reference may be made to the corresponding process description in the preceding method embodiment for the specific working procedures of the devices and the modules described above, so the details are not repeated herein.

Figure 4:
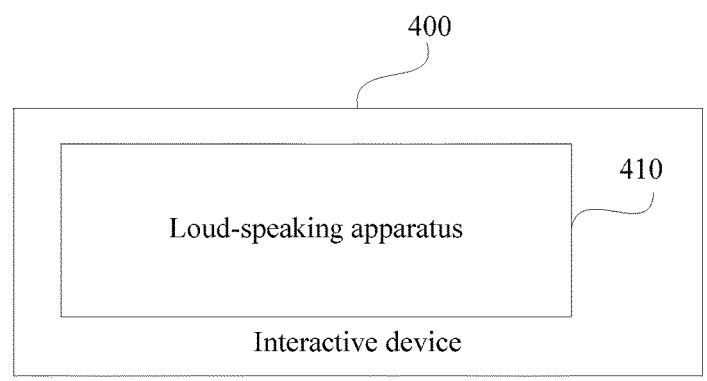
FIG. 4 is a schematic structural block diagram of an interactive device according to an embodiment of the present application.

FIG. 4 is a schematic structural block diagram of an interactive device 400 according to an embodiment of the present application. In this example embodiment, the interactive device 400 comprises the loud-speaking apparatus 410 described in the above embodiment.

Figure 5:
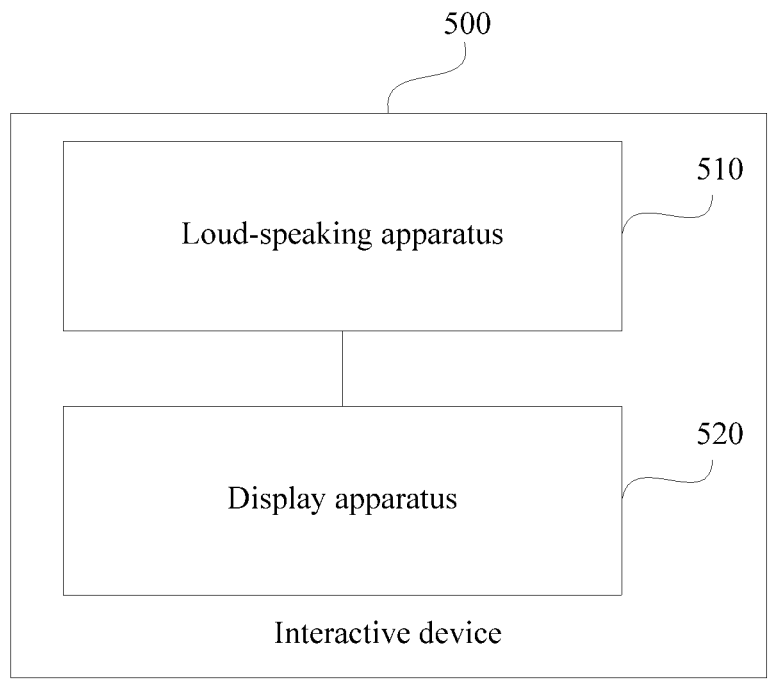
FIG. 5 is a schematic structural block diagram of an interactive device according to an embodiment of the present application.

As shown in FIG. 5, in one example embodiment of the present application, the interactive device 500 is an electronic device having a display function, for example, a personal computer, a smart phone, a mobile personal computer, or a tablet computer. In this example embodiment, in addition to the loud-speaking apparatus 510, the interactive device 500 further comprises:

a display apparatus 520 comprising a display screen.

Figure 5A:
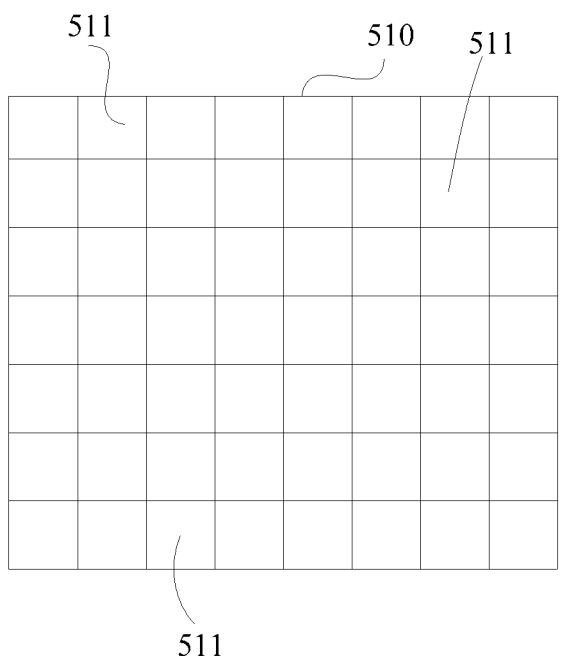
FIG. 5a is a schematic structural diagram of a loudspeaker array of an interactive device according to an embodiment of the present application.

As shown in FIG. 5*a*, in this example embodiment, the loudspeaker array 510 is a loud-speaking layer formed by multiple transparent thin film loud-speaking units 511. In the embodiment of the present application, the loudspeaker array 510 at least partially covers a display area of the display screen, and thus it is unnecessary to arrange a loudspeaker or another external loudspeaker around a display area of the electronic device. In this example embodiment, the loudspeaker array 510 entirely covers the display area of the display screen.

Figure 5B:
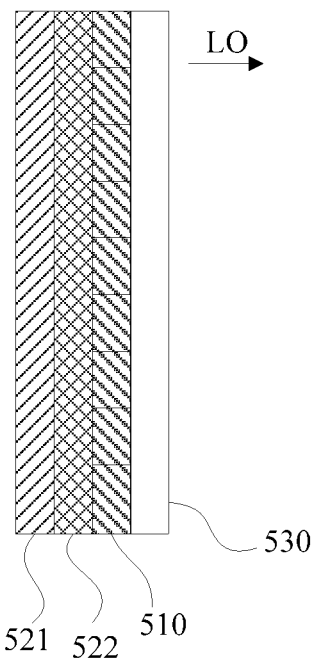
FIG. 5b is a schematic hierarchical structural diagram of an interactive device according to an embodiment of the present application.

FIG. 5*b* is a schematic hierarchical structural diagram of the display apparatus 520 and the loudspeaker array 510 in this example embodiment. The display apparatus 520 comprises a display layer 521 and a touch layer 522; certainly, in other example embodiments, there may be no touch layer 522. In this example embodiment, the touch layer 522, the loudspeaker array 510 and a protective layer 530 for protecting the loudspeaker array 510 are distributed outwardly in sequence from a light outgoing side of the display layer 521 along a light outgoing direction LO.

Certainly, in addition to the above structure, in other example embodiments of the present application, positions of the display layer 521, the touch layer 522, and the loudspeaker array 510 in the hierarchical structure may also be in other forms, for example, the loudspeaker array 510 is located between the display layer 521 and the touch layer 522. Certainly, other layers may also be added.

In this example embodiment, in addition to a fault that may occur in the loudspeaker array 510, an interactive operation of a user touching the touch layer 522 may also bring about a sound production fault to loud-speaking units of the loudspeaker array 510. Therefore, the sound production fault may also be compensated by the device of the embodiment of the present application. In this example embodiment, the touch layer 522 may also serve as a part of the fault detection module of the loud-speaking apparatus.

To sum up, through the several example embodiments of the embodiment of the present application, an impact of a loud-speaking unit, of the loudspeaker, having a sound production fault on a sound effect of the loudspeaker can be reduced, and when the loud-speaking unit having a sound production fault exists, better acoustic experience still can be provided for the users.

Figure 6:
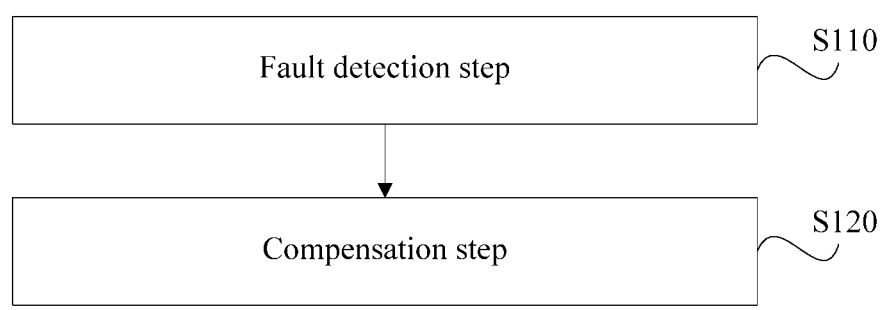
FIG. 6 is a schematic flowchart of a loud-speaking method according to an embodiment of the present application.

FIG. 6 illustrates a loud-speaking method provided in an embodiment of the present application, comprising:

S110. A fault detection step: detect fault parameters of at least one loud-speaking unit in a loudspeaker array, wherein the loudspeaker array comprises multiple loud-speaking units, and each loud-speaking unit is configured to produce sound according to an input signal; and S120. A compensation step: when at least one loud-speaking unit having a sound production fault exists, adjusting, according to the fault parameters, the input signal corresponding to at least one related loud-speaking unit in the loudspeaker array, to compensate for a sound effect of the loudspeaker array affected by the at least one loud-speaking unit that has a sound production fault and corresponds to the fault parameters.

In this embodiment, fault parameters affecting a sound effect of a loudspeaker array comprising multiple loud-speaking units are detected, and when the fault parameters indicate that a loud-speaking unit having a sound production fault exists, an input signal corresponding to the loud-speaking unit is adjusted, so as to reduce an impact of the loud-speaking unit having a sound production fault on a sound effect of the loudspeaker array during use of the loudspeaker array, and improve user experience.

The steps of the embodiment of the present application are further described below.

S110. A fault detection step: detect fault parameters of at least one loud-speaking unit in a loudspeaker array, wherein the loudspeaker array comprises multiple loud-speaking units, and each loud-speaking unit is configured to produce sound according to an input signal.

In one example embodiment, the input signals corresponding to at least two loud-speaking units in the multiple loud-speaking units are different. For example, the multiple loud-speaking units in the loudspeaker array may separately correspond to multiple different input signals, that is, the multiple different input signals may be controlled separately. Alternatively, the multiple loud-speaking units may be divided into multiple loud-speaking unit groups, each loud-speaking unit group comprises at least two loud-speaking units, the loud-speaking units in each loud-speaking unit group correspond to the same input signal (for example, a group of loud-speaking units share the same conductor for signal input). With such a structure, when a sound production fault occurs in one or more loud-speaking units, other loud-speaking units can compensate for the overall sound effect of the loudspeaker array by adjusting the corresponding input signal. Herein, the input signals may be, for example, a vibration sequence signal including amplitude, frequency, and phase information, which is used to determine the vibration amplitude, frequency, and phase of the corresponding loud-speaking units. Certainly, in an example embodiment, the input signals of the multiple loud-speaking units are the same, and when at least one obstacle is detected, raising the amplitude of the input signals can also compensate for the sound effect of the loudspeaker array.

S120. When at least one loud-speaking unit having a sound production fault exists, adjust, according to the fault parameters, the input signal corresponding to at least one related loud-speaking unit in the loudspeaker array, to compensate for a sound effect of the loudspeaker array affected by the at least one loud-speaking unit that has a sound production fault and corresponds to the fault parameters.

In one example embodiment, the compensation step may comprise: directly generating a new input signal correspondingly according to the fault parameters and a current input signal. In other example embodiments, the compensation step may comprise: superimposing, according to the fault parameters, a compensation signal component on the input signal corresponding to each loud-speaking unit, and this example embodiment has been described above, so the details are not repeated herein. Herein, the compensating for a sound effect of the loudspeaker array affected by the at least one loud-speaking unit having a sound production fault specifically is: reducing a difference between a waveform, on at least one target position (for example, the position of a listener's ears), of a sound wave produced by the loudspeaker array under the effect of the at least one loud-speaking unit having a sound production fault and a waveform when there is no loud-speaking unit having a sound production fault.

In one example embodiment, the compensation step comprises:

a determining step: determining, according to the fault parameters, the at least one related loud-speaking unit and input signal adjustment parameters corresponding to the at least one related loud-speaking unit; and an adjustment step: adjusting, according to the input signal adjustment parameters, the input signal corresponding to the at least one related loud-speaking unit.

The input signal adjustment parameters comprise at least one type of the following:

amplitude adjustment parameters, phase adjustment parameters, and frequency adjustment parameters.

In one example embodiment, the determining step comprises:

determining the at least one loud-speaking unit having a sound production fault according to the fault parameters; and determining, according to the at least one loud-speaking unit having a sound production fault, the at least one related loud-speaking unit and the input signal adjustment parameters corresponding to the at least one related loud-speaking unit.

The determining the at least one loud-speaking unit having a sound production fault according to the fault parameters comprises:

determining, according to the fault parameters, position information about a position where a fault occurs, and determining the at least one corresponding loud-speaking unit having a sound production fault according to the position information.

In another example embodiment, the determining step comprises:

determining the at least one loud-speaking unit having a sound production fault and fault information of the at least one loud-speaking unit having a sound production fault according to the fault parameters; and determining, according to the at least one loud-speaking unit having a sound production fault and the fault information, the at least one related loud-speaking unit and the input signal adjustment parameters corresponding to the at least one related loud-speaking unit.

In this example embodiment, the fault information comprises at least one type of the following: fault type information and fault degree information.

In this example embodiment, the fault parameters comprise acoustic characteristic parameters of each loud-speaking unit. The determining step comprises: determining, according to the acoustic characteristic parameters of the loud-speaking units, the at least one loud-speaking unit having a sound production fault, at least one related loud-speaking unit to be adjusted, and a corresponding input signal.

Please refer to corresponding description in the apparatus embodiments shown in FIG. 1 to FIG. 4 for detailed implementation processes of the steps, so the details are not repeated herein.

Those skilled in the art can understand that, in the embodiments of the present application, sequence numbers of the following steps do not mean an order of execution, the order of execution of the steps should be determined according to their functions and internal logic, but should not form any limit to the implementation process of the specific example embodiments of the present application.

Persons of ordinary skill in the art may appreciate that, in combination with the examples described in the embodiments disclosed in this specification, units and method steps may be implemented by electronic hardware, or a combination of computer software and electronic hardware. Whether these functions are executed as hardware or software depends upon the particular application and design constraint conditions of the technical solution. Persons skilled in the art can use different methods to implement the described functions for each particular application, but it should not be considered that the implementation goes beyond the scope of the present application.

When the function is implemented in the form of the software functional unit and sold or used as a separate product, the function may be stored in a computer readable storage medium. Therefore, the technical solution of the present application or the part that makes contributions to the prior art can be substantially embodied in the form of a software product. The computer software product is stored in a storage medium, and contains several instructions to instruct computer equipment (such as, a personal computer, a server, or network equipment) to perform all or a part of steps of the method as described in the embodiments of the present application. The storage medium includes various media capable of storing program code, such as, a flash disk, a mobile hard disk, a read-only memory (ROM), a random access memory (RAM), a magnetic disk or an optical disc.

The above implementations are only used to describe the present application, instead of limiting the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. An apparatus, comprising:
 a loudspeaker array comprising multiple loud-speaking units configured to produce respective sounds according to respective input signals;
 a memory that stores executable modules; and
 a processor, coupled to the memory, that executes the executable modules to perform operations of the apparatus, the executable modules comprising:

a fault detection module configured to detect a fault parameter of at least one loud-speaking unit in the loudspeaker array; and a compensation module configured to, in response to a loud-speaking unit of the at least one loud-speaking unit having a sound production fault, adjust, according to the fault parameter, respective input signals corresponding to the at least one loud-speaking unit in the multiple loud-speaking units, to compensate for a sound effect of the loudspeaker array affected by the at least one loud-speaking unit having the at least one sound production fault, wherein a difference is reduced between a first waveform generating a first sound wave at a target position and a second waveform generating a second sound wave at the target position, wherein the first waveform corresponds to the at least one loud-speaking unit having the at least one sound production fault, wherein the second waveform corresponds to another loud-speaking unit of the loudspeaker array not having the at least one sound production fault, wherein the loudspeaker array comprises at least one other loud-speaking unit other than the at least one loud-speaking unit having the at least one sound production fault in the multiple loud-speaking units, and wherein the loudspeaker array comprises loud-speaking units to be adjusted not to have the at least one sound production fault.

2. The apparatus of claim 1, wherein at least two input signals corresponding to at least two loud-speaking units in the multiple loud-speaking units are different.

3. The apparatus of claim 1, wherein the compensation module comprises:

a determining unit configured to determine, according to the fault parameter, the at least one loud-speaking unit and at least one input signal adjustment parameter corresponding to the at least one loud-speaking unit; and an adjustment unit configured to adjust, according to the at least one input signal adjustment parameter, the respective input signals corresponding to the at least one loud-speaking unit.

4. The apparatus of claim 3, wherein the at least one input signal adjustment parameter comprise at least one of:

an amplitude adjustment parameter, a phase adjustment parameter, or a frequency adjustment parameter.

5. The apparatus of claim 3, wherein the determining unit comprises:

a first determining sub-unit configured to determine a loud-speaking unit having a sound production fault according to the fault parameter; and a second determining sub-unit configured to determine, according to the loud-speaking unit having the sound production fault, the at least one loud-speaking unit and the at least one input signal adjustment parameter corresponding to the at least one loud-speaking unit.

6. The apparatus of claim 4, wherein the determining unit comprises:

a first determining sub-unit configured to determine, according to the fault parameter, the at least one loud-speaking unit having the sound production fault and fault information of the at least one loud-speaking unit having the sound production fault; and a second determining sub-unit configured to determine, according to the at least one loud-speaking unit having the sound production fault and the fault information, the at least one loud-speaking unit and the at least one input signal adjustment parameter corresponding to the at least one loud-speaking unit.

7. The apparatus of claim 5, wherein the first determining sub-unit is further configured to determine, according to the fault parameter, position information about a position where a fault occurs, and determine the at least one corresponding loud-speaking unit having the sound production fault according to the position information.

8. The apparatus of claim 6, wherein the fault information comprises at least one of fault type information or fault degree information.

9. The apparatus of claim 1, wherein the fault parameter comprises an acoustic characteristic parameter of the multiple loud-speaking units.

10. The apparatus of claim 1, wherein the at least one loud-speaking unit comprises the at least one loud-speaking unit having the sound production fault.

11. The apparatus of claim 1, further comprising an interactive interface.

12. The apparatus of claim 11, wherein the interactive interface comprises:

a display apparatus comprising a display screen;

wherein the multiple loud-speaking units of the apparatus are transparent loud-speaking units, and the loudspeaker array at least partially covers a display area of the display screen.

13. The apparatus of claim 12, wherein the multiple loud-speaking units of the apparatus are transparent thin film loud-speaking units.

14. A method, comprising:

detecting, by a device comprising a processor, at least one fault parameter of at least one loud-speaking unit in a loudspeaker array, wherein the loudspeaker array comprises multiple loud-speaking units configured to produce respective sounds according to respective input signals, and wherein the loudspeaker array comprises an unfaulted loud-speaking unit that is not associated with a sound production fault; and in response to a loud-speaking unit of the at least one loud-speaking unit having the sound production fault, adjusting, according to the at least one fault parameter, the respective input signals corresponding to at least one related loud-speaking unit in the multiple loud-speaking units, to compensate for a sound effect of the loudspeaker array affected by the at least one loud-speaking unit that has the sound production fault resulting in a reduced difference between a first waveform associated with sound produced by the at least one loud-speaking unit that has the sound production fault and a second waveform associated with sound produced by the unfaulted loud-speaking unit, wherein the at least one related loud-speaking unit comprises at least one other loud-speaking unit other than the at least one loud-speaking unit having the sound production fault in the multiple loud-speaking units.

15. The method of claim 14, wherein at least two input signals of the respective input signals, corresponding to at least two loud-speaking units in the multiple loud-speaking units, are different.

16. The method of claim 14, wherein the adjusting the respective input signal corresponding to the at least one related loud-speaking unit comprises:

determining, according to the at least one fault parameter, the at least one related loud-speaking unit and at least one input signal adjustment parameter corresponding to the at least one related loud-speaking unit; and adjusting, according to the at least one input signal adjustment parameter, the respective input signals corresponding to the at least one related loud-speaking unit.

17. The method of claim 16, wherein the at least one input signal adjustment parameter comprises at least one of:
an amplitude adjustment parameter, a phase adjustment parameter, or a frequency adjustment parameter.

18. The method of claim 16, wherein the determining the at least one related loud-speaking unit and the at least one input signal adjustment parameter corresponding to the at least one related loud-speaking unit comprises:
determining the at least one loud-speaking unit having the sound production fault according to the at least one fault parameter; and
determining, according to the at least one loud-speaking unit having the sound production fault, the at least one related loud-speaking unit and the at least one input signal adjustment parameter corresponding to the at least one related loud-speaking unit.

19. The method of claim 16, wherein the determining the at least one related loud-speaking unit and at least one input signal adjustment parameter corresponding to the at least one related loud-speaking unit comprises:
determining the at least one loud-speaking unit having the sound production fault and fault information of the at least one loud-speaking unit having the sound production fault according to the at least one fault parameter; and
determining, according to the at least one loud-speaking unit having the sound production fault and the fault information, the at least one related loud-speaking unit and the at least one input signal adjustment parameter corresponding to the at least one related loud-speaking unit.

20. The method of claim 18, wherein the determining the at least one loud-speaking unit having the sound production fault according to the at least one fault parameter comprises:
determining, according to the at least one fault parameter, position information about a position where a fault occurs and determining the at least one corresponding loud-speaking unit having the sound production fault according to the position information.

21. The method of claim 19, wherein the fault information comprises at least one of fault type information or fault degree information.

22. The method of claim 14, wherein the at least one fault parameter comprises at least one acoustic characteristic parameter of the multiple loud-speaking units.

23. The method of claim 14, wherein the at least one related loud-speaking unit comprises the at least one loud-speaking unit having a sound production fault.

24. A computer readable storage device comprising executable instructions that, in response to execution, cause a device comprising a processor to perform operations, comprising:
detecting a fault parameter of a first loud-speaking unit of a loudspeaker array, wherein the first loud-speaking unit is configured to produce a sound according to an input signal, wherein the first loud-speaking unit has a sound production fault, and wherein the loudspeaker array comprises a second loud-speaking unit that does not have the sound production fault; and
adjusting, according to the fault parameter, input signals corresponding to loud-speaking units comprising the loudspeaker array to compensate for a sound effect of the loudspeaker array affected by the first loud-speaking unit resulting from the sound production fault, wherein the adjusting the input signals reduces a difference between a first waveform associated with sound from the first loud-speaking unit and a second waveform associated with sound from the second loud-speaking unit, and wherein the loudspeaker array comprises at least one other loud-speaking unit other than the first and the second loud-speaking unit.

* * * * *